No. 777,268. PATENTED DEC. 13, 1904.
T. E. THOMPSON.
EDUCATIONAL APPLIANCE.
APPLICATION FILED JAN. 9, 1904.
NO MODEL. 2 SHEETS—SHEET 1.
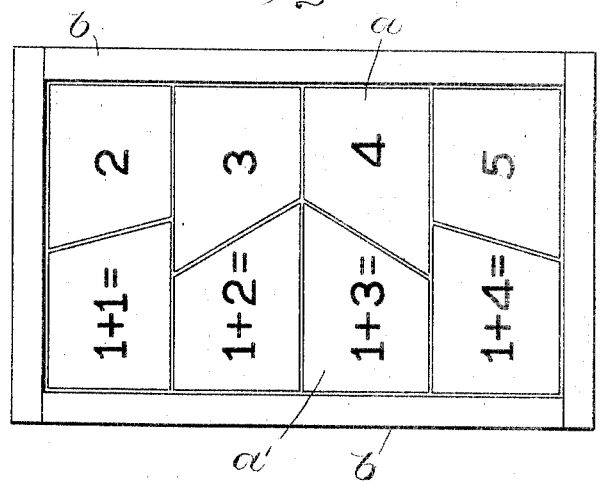
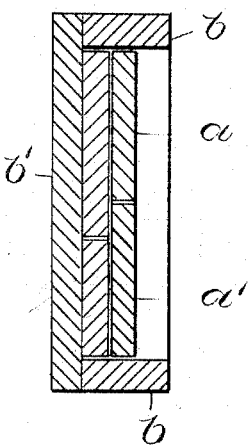
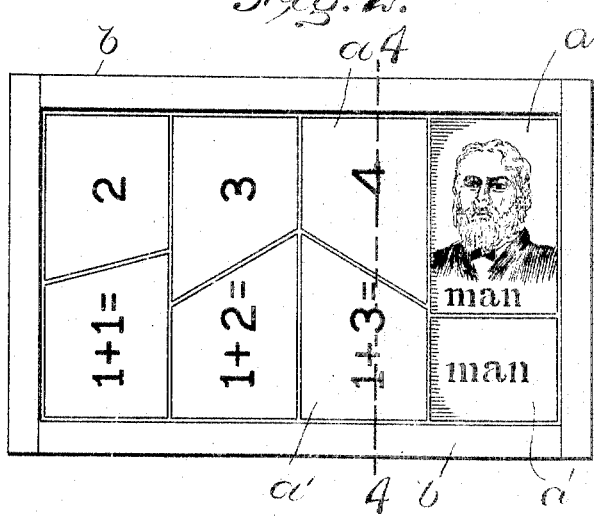
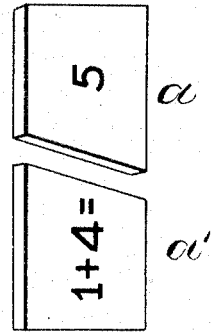
Witnesses:
E. Batchelder
Walter D. Abell
Inventor.
Thomas E. Thompson
by Knight Bros & Quimby
Attys No. 777,268. PATENTED DEC. 13, 1904.
T. E. THOMPSON.
EDUCATIONAL APPLIANCE.
APPLICATION FILED JAN. 9, 1904.
NO MODEL. 2 SHEETS—SHEET 2.
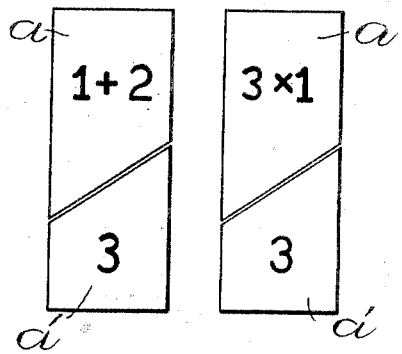
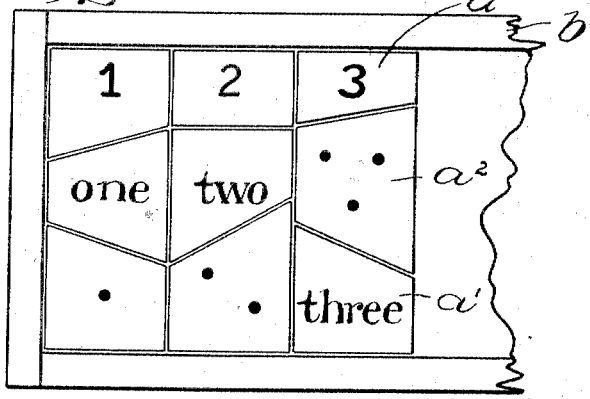
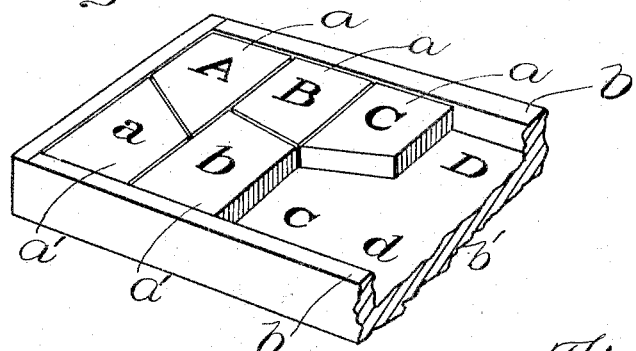
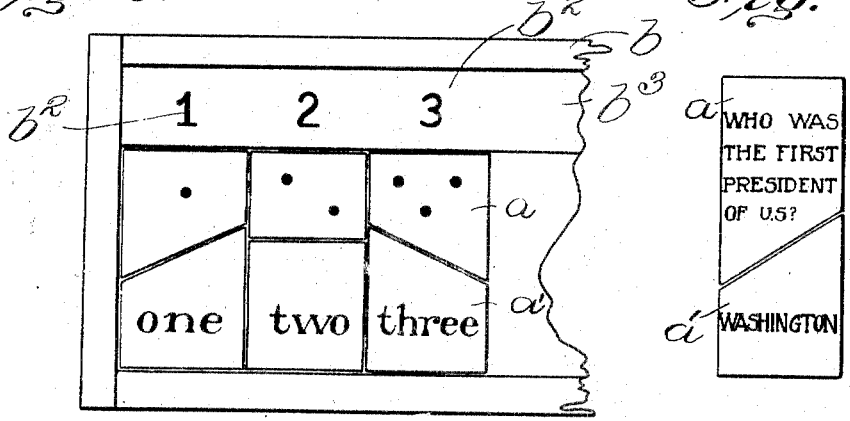
Witnesses:
A. C. Ratigan
E. Batchelder
Inventor:
Thomas E. Thompson
by Wight Brown Quinby
Attys.

No. 777,268. Patented December 13, 1904.

UNITED STATES PATENT OFFICE.

THOMAS E. THOMPSON, OF LEOMINSTER, MASSACHUSETTS.

EDUCATIONAL APPLIANCE.

SPECIFICATION forming part of Letters Patent No. 777,268, dated December 13, 1904.

Application filed January 9, 1904. Serial No. 188,287. (No model.)

*To all whom it may concern:*

Be it known that I, THOMAS E. THOMPSON, of Leominster, in the county of Worcester and State of Massachusetts, have invented certain new and useful Improvements in Educational Appliances, of which the following is a specification.

This invention relates to means for teaching the relation between symbols or characters with which the mind of the learner is familiar and printed words or other expressions or embodiments of the same words, symbols, or characters.

The invention consists in an appliance having the characteristics hereinafter described and claimed.

Of the accompanying drawings, forming a part of this specification, Figures 1 and 2 represent plan views of appliances embodying my invention. Fig. 3 represents a perspective view of one of the blocks shown in Fig. 1, the sections of the block being separated. Fig. 4 represents a section on line 4 4 of Fig. 2. Fig. 5 is a detail view of two separate blocks adapted to be used interchangeably. Fig. 6 is a detail plan view of a modified form. Fig. 7 is a perspective view showing a further modification. Fig. 8 is a detail plan view showing a modified arrangement. Fig. 9 is a detail view of one of the blocks, showing a different use.

The same reference characters indicate the same parts in all the figures.

In carrying out my invention I provide a series of rectangular blocks or strips, said blocks being preferably made of wood and each being preferably a relatively thin flat tablet. Each block is divided transversely into a group of preferably two sections $a$ and $a'$, said sections being separable from each other. The proportions of the sections differ in the different blocks of the series, the sections being formed so that no section can form a part of a block of standard or predetermined length excepting when associated with the complemental section. The complemental sections of each block are suitably designated not only by their form, but by marks or inscriptions of such nature as to impart instruction to the user when the sections are assembled to form a complete block, the designating marks or inscriptions on the sections differing from each other in such manner that they coöperate in imparting instruction, as hereinafter described. One section of each block may bear as a designation a picture, character, or symbol, while the complemental section may bear as a complemental designation an expression or embodiment of the said picture, character, or symbol.

In Fig. 1 I show a series of blocks the sections $a$ of which bear numerals "2," "3," "4," &c., while the sections $a'$ bear expressions indicating the addition of one or more series of numbers, such as "1 + 1," "2 + 1," "1 + 3," &c. The length of the blocks is such that each will fit accurately between two opposed walls $b$ $b$, which may be opposite sides of a box having a bottom $b'$, on which the blocks may rest. The sections $a$ and $a'$ of the different blocks are so proportioned that a block of standard length or of a length which will fit the space between the walls $b$ $b$ can be formed only by the assemblage with each section $a$ of a section $a'$ correspondingly designated or bearing an expression or embodiment of the picture, character, or symbol marked on the section $a$. For instance, in the embodiment of my invention shown in Fig. 1 one block of standard length is formed by the assemblage of a section designated by the numeral "2" and another section designated by the expression "1 + 1." Neither of the said sections can be assembled with any other section of the series to form a block of the required or standard length. Each group of blocks is complementally designated in the same manner.

At the right-hand portion of Fig. 2 a section $a$ is shown bearing a picture of some object which is familiar to the childish mind and a complemental section $a'$ bearing a printed or written word descriptive of the picture. A set of blocks of this description is of value for the use of the youngest pupils in teaching the first lessons in reading. A set of the form shown in Fig. 1 will be of value with pupils who are slightly more advanced in teaching simple arithmetical calculations. It is obvious that suitable changes in the marking of the blocks can be made to adapt the blocks for use not only in teaching addition, but also for teaching subtraction, multiplication, or division.

If preferred, the set may include blocks of several descriptions—for instance, pictorial blocks and numerical blocks. Fig. 2 illustrates such a combination set, the box being supposed to contain two layers of blocks, one block at the right-hand end of the upper layer being removed to expose the corresponding block of the bottom layer. In this case the top layer may be made up of the numerical blocks and the bottom layer of the pictorial blocks.

The appliance furnishes a puzzle which adds a feature of great interest to young pupils in their first schoolwork. The pupils become intent upon the puzzle of putting the sections of the blocks in their proper relation to each other and during the operation unavoidably gather some knowledge of the characters and expressions which appear upon the blocks.

It is obvious that the invention may be embodied in a series of blocks apart from the supporting-base $b'$ or the confining-walls $b$. These parts, however, are convenient and valuable as a means for protecting and preserving the blocks, and the opposed walls $b$ serve the further purpose of a guide to determine the proper length of the complete blocks when the sections $a\,a'$ are assembled, indicating the correctness of the solution of the puzzle by the fact that the completed block is an exact fit between the two walls, whereas if incorrectly put together the two sections $a\,a'$ will collectively form a block that is either too long or too short to fit the space between the walls $b\,b$.

It will be seen that the series may include any desired number of blocks and that each block may be very cheaply and conveniently manufactured by sawing into two or more parts a strip of wood, the location of the cut relatively to the ends of the block being different in each block from all the other blocks.

It is obvious that a set of blocks may contain two or more duplicate blocks the pictures of which have the same form in each block, but are differently designated. In Fig. 5 I show two blocks the sections $a\,a$ of which are alike in form, as also are the sections $a'\,a'$. The designating-marks on one of the sections $a$ differ from those on the other section $a$; but the marks on both sections $a$ have the same significance or meaning, so that either section $a$ may be used interchangeably with either section $a'$.

In Fig. 6 I show each block as composed of three sections $a, a'$, and $a^2$, one section of each block being designated by a word, symbol, or character, while the other two sections are designated by different expressions or embodiments of the same word, symbol, or character. The sections $a$ may be affixed to the box, if desired.

In Fig. 7 I show complemental designations on the bottom of the box corresponding to the complemental designations on the sections $a\,a'$ and serving to guide the learner in placing the block-sections.

In Fig. 8 I show the box or holder provided with designating characters $b^2$ which are complemental to the designating characters on the adjacent blocks. The characters $b^2$ may be formed on a strip $b^3$, affixed to the bottom and one wall of the box.

In Fig. 9 I show a block the section $a$ of which is designated by a question, while the section $a'$ is designated by an answer to the question.

I claim—

1. An educational appliance comprising a series of blocks of uniform length, each divided into complemental sections which are complementally designated, the relative proportions of the sections differing in each block from other blocks of the series, so that a block of standard length can be formed only by the assemblage of complementally-designated sections.

2. An educational appliance comprising a series of blocks of uniform length, each divided into two complemental sections, the relative proportions of the sections differing in each block from other blocks of the series, so that only complemental sections coöperate in forming a block of standard length, one section of each block bearing a designation, while the complemental section bears a complemental designation.

3. An educational appliance comprising a holder having opposed parallel walls forming the sides of a block-receiving space of uniform width, a series of blocks of uniform length, each formed to extend across said space and each divided into complementally-designated sections, the relative proportions of which differ in each block, so that a block of standard length fitting the space between said walls can be formed only by the assemblage of complementally-designated sections.

4. An educational appliance comprising a series of blocks of uniform length, each divided into complemental sections which are complementally designated, the line of division between complemental sections being continuous in the direction of the length of the line, the relative proportions of the sections differing in each block from other blocks of the series, so that a block of standard length can be formed only by the assemblage of complementally-designated sections.

5. An educational appliance comprising a series of blocks of uniform length, each divided into two complemental sections, the line of division between complemental sections being continuous in the direction of the length of the line, the relative proportions of the sections differing in each block from other blocks of the series, so that only complemental sections coöperate in forming a block of standard length, one section of each block bearing a designation, while the complemental section bears a complemental designation.

6. An educational appliance comprising a holder having opposed parallel walls forming the sides of a block-receiving space of uniform width, a series of blocks of uniform length adapted, when properly assembled, to fit within said space, each block being divided into complemental sections which are complementally designated, the relative proportions of the sections differing in each block from other blocks of the series, a correct assemblage of the blocks being determined by the length of the sections, whereby a block of standard length fitting the space between said walls can be formed only by the assemblage of complementally-designated sections.

In testimony whereof I have affixed my signature in presence of two witnesses.

THOMAS E. THOMPSON.

Witnesses:
C. F. BROWN,
E. BATCHELDER.